(12) United States Patent
Zaloum et al.

(10) Patent No.: US 7,663,805 B2
(45) Date of Patent: Feb. 16, 2010

(54) EYEWEAR DISPLAY AND MEDIA DEVICE INTERCONNECTION SYSTEM

(75) Inventors: Thomas Zaloum, Arlington, MA (US); Mark B. Spitzer, Sharon, MA (US)

(73) Assignee: MYVU Corporation, Westwood, MA (US)

( * ) Notice: Subject to any disclaimer, the term of this patent is extended or adjusted under 35 U.S.C. 154(b) by 0 days.

(21) Appl. No.: 11/973,637

(22) Filed: Oct. 9, 2007

(65) Prior Publication Data

US 2009/0091838 A1    Apr. 9, 2009

(51) Int. Cl.
*G02B 27/14* (2006.01)

(52) U.S. Cl. .................. 359/630; 359/618; 351/123

(58) Field of Classification Search ................. 359/630, 359/618
See application file for complete search history.

(56) References Cited

U.S. PATENT DOCUMENTS 6,349,001 B1 * 2/2002 Spitzer ....................... 359/618
7,313,246 B2 * 12/2007 Miller et al. ................. 381/381

* cited by examiner

*Primary Examiner*—Jordan M. Schwartz
*Assistant Examiner*—James C Jones
(74) *Attorney, Agent, or Firm*—Weingarten, Schurgin, Gagnebin & Lebovici LLP (57) ABSTRACT

An eyewear display and media device interconnection system enables a user to connect various media devices and various eyewear or other displays to each other, by using a common interface. The integrated system offers improved ergonomics, lower size, lower power consumption and lower cost.

23 Claims, 7 Drawing Sheets

EYEWEAR DISPLAY AND MEDIA DEVICE INTERCONNECTION SYSTEM

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

Portable personal media players and other media device products are reaching the market. These products deliver audio, video, email, web surfing, games, photography, GPS, communication, and other functions. As personal media devices become smaller, the flat panel displays integral to their surfaces become small and more difficult to use. Eyewear displays can solve the problems of the small display and obviate the need for a video display mounted on board the media device. See, for example, U.S. Pat. Nos. 5,886,822 and 6,879,443.

Even with eyewear displays, the user may still be faced with a range of cables, connectors, battery chargers, and interfaces which require plug converters and other circuits and hardware necessary so that non-integral or remote displays and other accessories can be used with a wide range of media device products. Since these media devices are envisioned for on-the-go applications, carrying a lot of gear interferes with the portability of both the eyewear displays and the media devices. What is needed is a simplified way to connect media devices and eyewear, without cumbersome gear. This simplification should also reduce the number of cables and connectors in the system. It is an object of this invention to simplify interconnection of a range of media devices with a range of eyewear displays and accessories.

A second issue related to portable media devices is miniaturization. Once the media device no longer requires an integral video display, its size is no longer dominated by the display. Therefore, a further objective of this invention is the use of an eyewear display to miniaturize a range of media products. This miniaturization is made possible by a high level of integration of the eyewear display drive electronics and the media device electronics. The result of simplified electronics is not only a smaller electronic printed circuit board size, but also lower power consumption, meaning that the size of the battery may be reduced, leading to cost reduction, and a further size reduction in the overall package. Thus this invention includes a new type of media device that has been designed for simplified integration with display eyewear.

SUMMARY OF THE INVENTION

This invention relates to a system for interconnecting media devices to eyewear devices in a power-efficient and ergonomic manner. This system enables a range of media devices, existing and new, to be interconnected with eyewear in a visually appealing and ergonomic manner with a minimum of cables. Also, the system provides a reduction of cost of the media device and the display eyewear.

In one embodiment, the eyewear display and media device interconnection system includes an upper part including eyewear display interface circuitry comprising circuits for formatting audio and video data to an eyewear display. A lower part includes a media device or media device interface. The upper and lower parts include an electrical interface connection for transmitting video and audio signals between the upper and the lower parts. A connecting device mechanically connects and disconnects the upper part and lower part.

DESCRIPTION OF THE DRAWINGS

The invention will be more fully understood by reference to the following detailed description of the invention in conjunction with the drawings, of which.

DETAILED DESCRIPTION OF THE INVENTION

Figure 1:
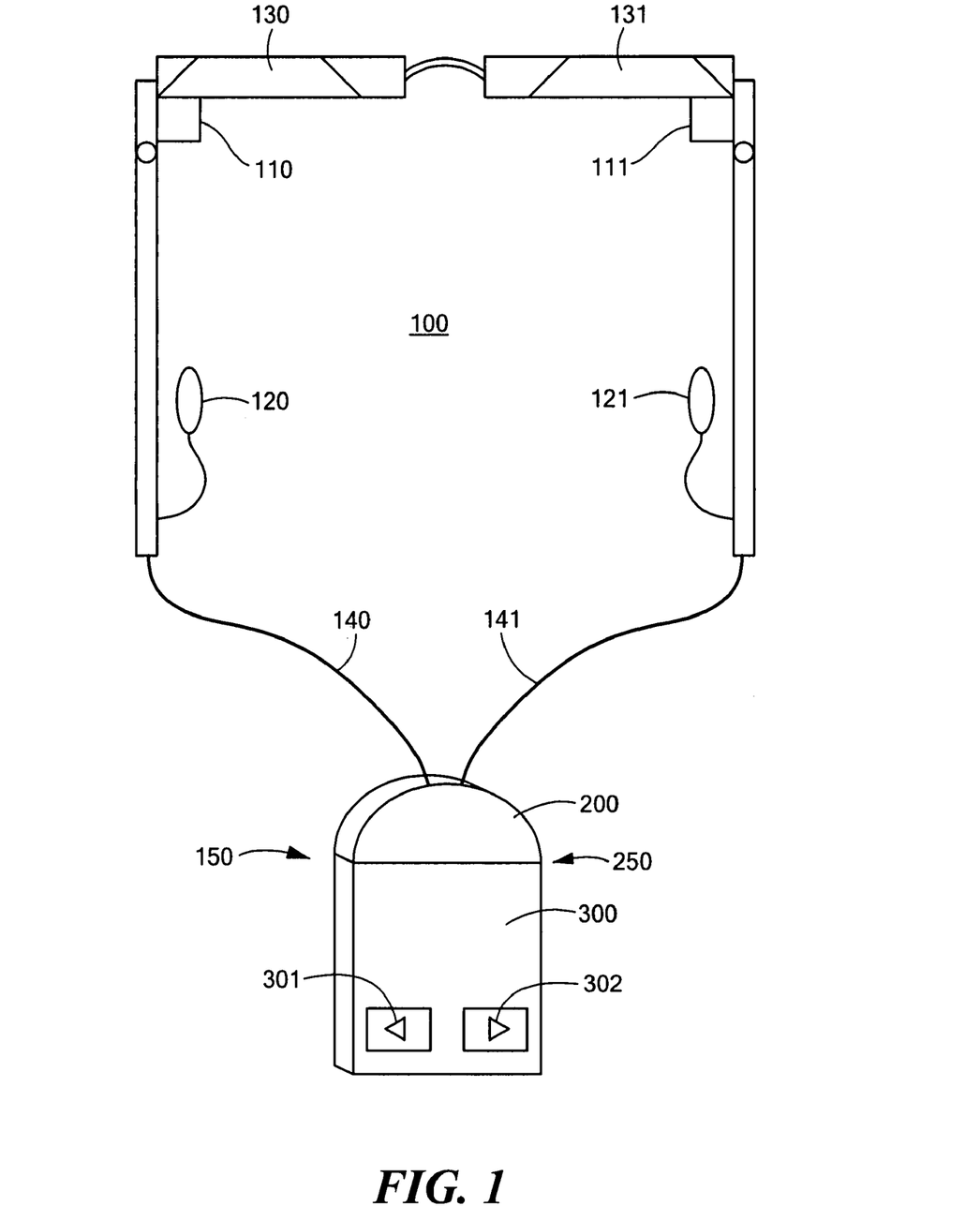
FIG. 1 is a schematic illustration of an embodiment of an eyewear display and media device interface system.

FIG. 1 illustrates an embodiment of an eyewear display system 100 in association with an eyewear display and media device interconnection system 150. The eyewear display system 100 comprises left and right audio transducers 120, 121, left and right display systems 110, 111, and left and right lenses 130, 131 that are capable of providing images to the eyes and sounds to the ears. The eyewear system 100 is connected by one or more cables 140, 141 via the interconnection system 150 to a media device (or media device interface). The interconnection system is formed from two parts: an upper part 200 which formats and provides signals to the eyewear 100, and a lower part 300 that is the media device, or alternatively comprises the media device interface. The upper and lower parts are joined at an interface 250 where signals and power are passed between the upper part 200 and the lower part 300. This interface uses a remountable connector so that the upper 200 part and lower part 300 may be separated. Part 300 may be created in various forms to provide various functions, as will be described. Embodiments of part 300 which are intended to function with the eyewear system 100 are designed with a common interface 250, so that such devices in the range of products that comprise a part 300 are able to function with the eyewear system 100. Additionally, embodiments of eyewear system 100 attached to upper part 200 are designed with the common interface 250 so that they function with a plurality of media devices in the various embodiments of part 300.

The system is able to provide the user with several different media devices (constituting several lower parts 300), each with a different function, that are designed to fit to the upper part 200 so that upper and lower parts clip together and function seamlessly. The user may also have several types of eyewear 100 that offer different functions, resolutions, or image formats. For example, the image format of one eyewear device may be 4:3 and another may be 16:9. The pixel format of one eyewear device may be 320 pixels by 240 pixels, and another may be 640 pixels by 480 pixels, or some other pixel format. The media device may detect which type of eyewear is attached and configure the video data accordingly. The upper part 200 associated with a particular eyewear system 100 may configure the video processing for best compatibility with the media device in lower part 300. To this end, each upper part 200 and lower part 300 may supply digital or analog data to the other identifying the type of device, by various methods known in the art.

It should be noted that not every part 300 will be compatible with every part 200, nor is such complete compatibility always attainable or desirable, owing to the introduction of improved products, firmware revisions, and other factors. A lower part 300 which works with some but not all embodiments of upper part 200 is within the scope of this invention. An upper part 200 that works with some but not all embodiments of lower part 300 is also within the scope of this invention.

Referring again to FIG. 1, it is noted that the cables 140, 141 may be made long enough so that the cables pass around the head and the upper and lower parts are positioned in front of the user. In this way the user has convenient on-the-go access to the controls of the media device. Alternatively, the cables may be arranged so that the upper and lower parts are behind the back or behind the head. Upper part 200 may be embedded within the eyewear frame, and lower part 300 may attach to the frame or be placed within a portion of the frame. In such a case, cables 140 and 141 may be internal to the eyewear frame. A single cable may be used to deliver power and signals to the eyewear system. In such a case, signals and power may be passed across the eyewear bridge as has been described in U.S. Pat. No. 6,879,443, or by some other manner (such as in a cable placed within a strap across the back or over the top of the head).

The media device 300 may be an MP3 or MP4 player, game system, GPS system, cellular telephone, digital television, electronic book reader, or any manner of portable communication or entertainment device. The media device 300 may be an ultra-mobile personal computer or personal digital assistant. The media device 300 may have pushbuttons 301 and switches 302 on its surfaces for user control of operation of the device.

The audio and video circuits that are generally specific to the eyewear are placed in the upper part 200. In general, the lower part 300 has the circuits specific to the media device. Common circuits may be placed in either upper part 200 or lower part 300, or may be redundantly placed in both parts.

Figure 2:
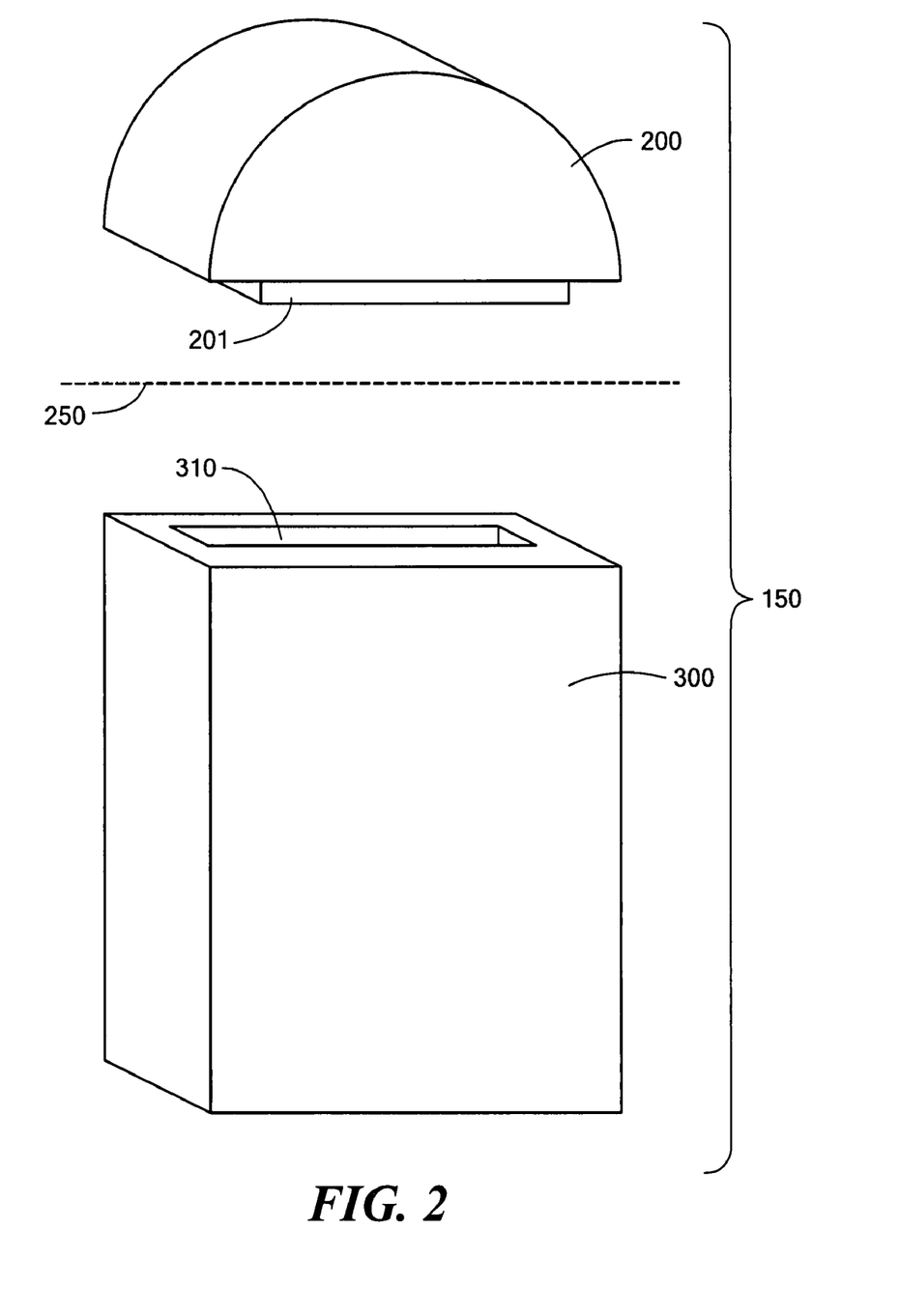
FIG. 2 is a schematic illustration showing upper and lower parts of the interface system separated.

FIG. 2 shows the media device (lower part 300) separated from the eyewear interface circuit (upper part 200). The upper 200 and lower 300 parts are provided with an upper connector 201 that inserts into the lower connector 310 so that the upper and lower circuits are in electrical contact. A connecting device is provided to hold the upper and lower portions together mechanically. The connecting device may be made as part of housings for the upper and lower parts. The connecting device may be made from latches, magnets, spring clips, a friction fit mechanism, or in any other remountable manner known in the art.

Table 1 indicates one possible interface connector pin assignment. In addition to power and ground, this interface provides audio lines, an 8 bit digital interface using the BT656 standard, analog stereo audio connections, mic interface, analog RGB interface, universal serial bus (USB) and other digital communications channels. Any number of pins and pin assignments may be made without departing from the scope of this invention.

TABLE 1

| PIN | ASSIGNMENT |
| --- | --- |
| 1 | GROUND |
| 2 | 3.3 V in |
| 3 | L Audio |
| 4 | Common audio return |
| 5 | R Audio |
| 6 | MIC |
| 7 | MIC GND |
| 8 | BT656 |
| 9 | BT656 |
| 10 | BT656 |
| 11 | BT656 |
| 12 | BT656 |
| 13 | BT656 |
| 14 | BT656 (or H Strobe if no DCLOCK) |
| 15 | BT656 (or V Strobe if no DCLOCK) |
| 16 | BT656 DCLOCK |
| 17 | RED |
| 18 | RED return |
| 19 | GREEN |
| 20 | GREEN return |
| 21 | BLUE |
| 22 | BLUE return |
| 23 | USB 5 V |
| 24 | USB D+ |
| 25 | USB D− |
| 26 | RX |
| 27 | TX |
| 28 | 12C SDA |
| 29 | 12C SCL |
| 30 | RESET |

Note that in Table 1 pins 14 and 15 are shown as sharing two functions. In the case where a valid DCLOCK is present, the circuitry uses BT656 (pins 8-16) as the input. In the case where a valid DCLOCK is not present, the system uses pins 14 and 15 for horizontal and vertical strobes for the red, green, blue analog input on pins 17-22. The sensing of a valid DCLOCK is made by logic in a microprocessor, gate array, or other logical device.

Table 1 is illustrative of one set of pin assignments. An alternative would be a fully analog interface, or a fully digital interface. A second alternative is an interface that provides for separate left and right video data so as to permit stereo or three dimensional images. Many other combinations of these functions are possible. One of the aspects is an interface in which the functions are partitioned so that the eyewear specific functions are mainly on one side of the interface and the functions specific to the media device are mainly on the other. Some level of redundancy of functionality may be desirable for the convenience of the user and for wide interchangeability of eyewear and media devices.

Figure 3:
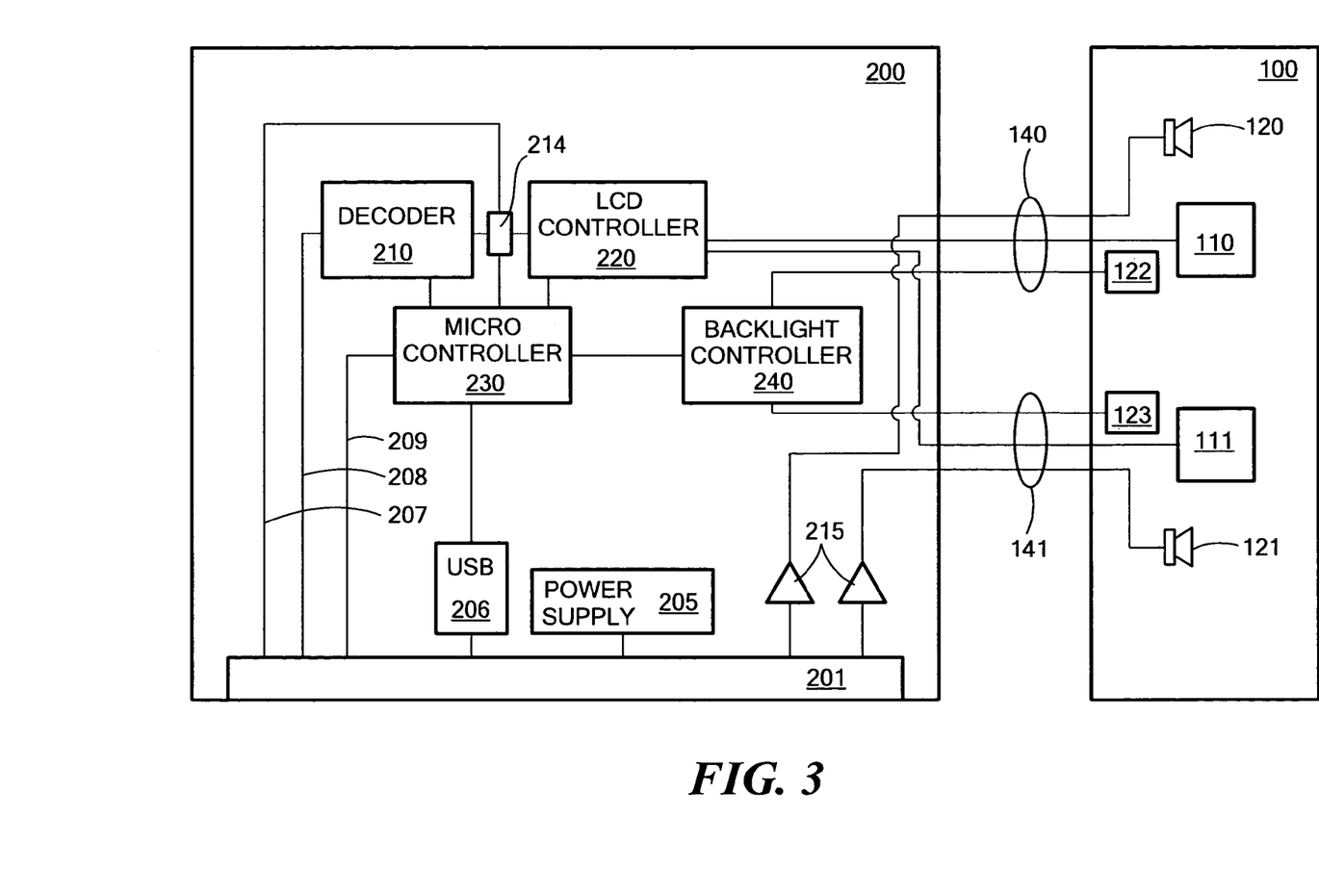
FIG. 3 is a block diagram of the eyewear display interface circuitry of the upper part.

FIG. 3 illustrates a block diagram of the functions of the eyewear electronics in upper part 200. It should be noted that the connections in the block diagram indicate data, signal or logical paths that may consist of a single wire, or a multi-wire bus, or shielded conductor or conductors.

Referring to FIG. 3, the upper part 200 is in electrical communication with the lower part 300 through upper connector 201. Power is connected to power supply 205 which conditions the power and supplies it to other circuits. BT656 (and/or H and V Strobes) are sent to gate array 214 by a parallel digital bus 207. Signals present at the USB pins are provided to a USB UART or other device 206. These digital signals are interpreted and provided to the microcontroller 230. Analog signals, if present, are provided to a decoder circuit 210 by lines 208. If analog signals are present, the decoder 210 provides digital data to a gate array 214 which is in communication with the LCD control circuit 220. The microprocessor logic determines whether the LCD controller 220 should utilize input from the decoder 210 or the BT656 bus 207 and sets the gates in gate array 214 accordingly. The microprocessor also provides commands to the backlight controller 240.

The output of the backlight controller 240, LCD controller 220, audio from amplifiers 215 and power are provided to the eyewear headset 100 through cables 140, 141, or alternatively through a single cable. In this way, LEDs 122, 123 receive drive current from backlight controller 240, LCDs 110 and 111 receive drive signals from LCD controller 220, and earphones 120 and 121 receive audio from amplifiers 215.

Figure 4:
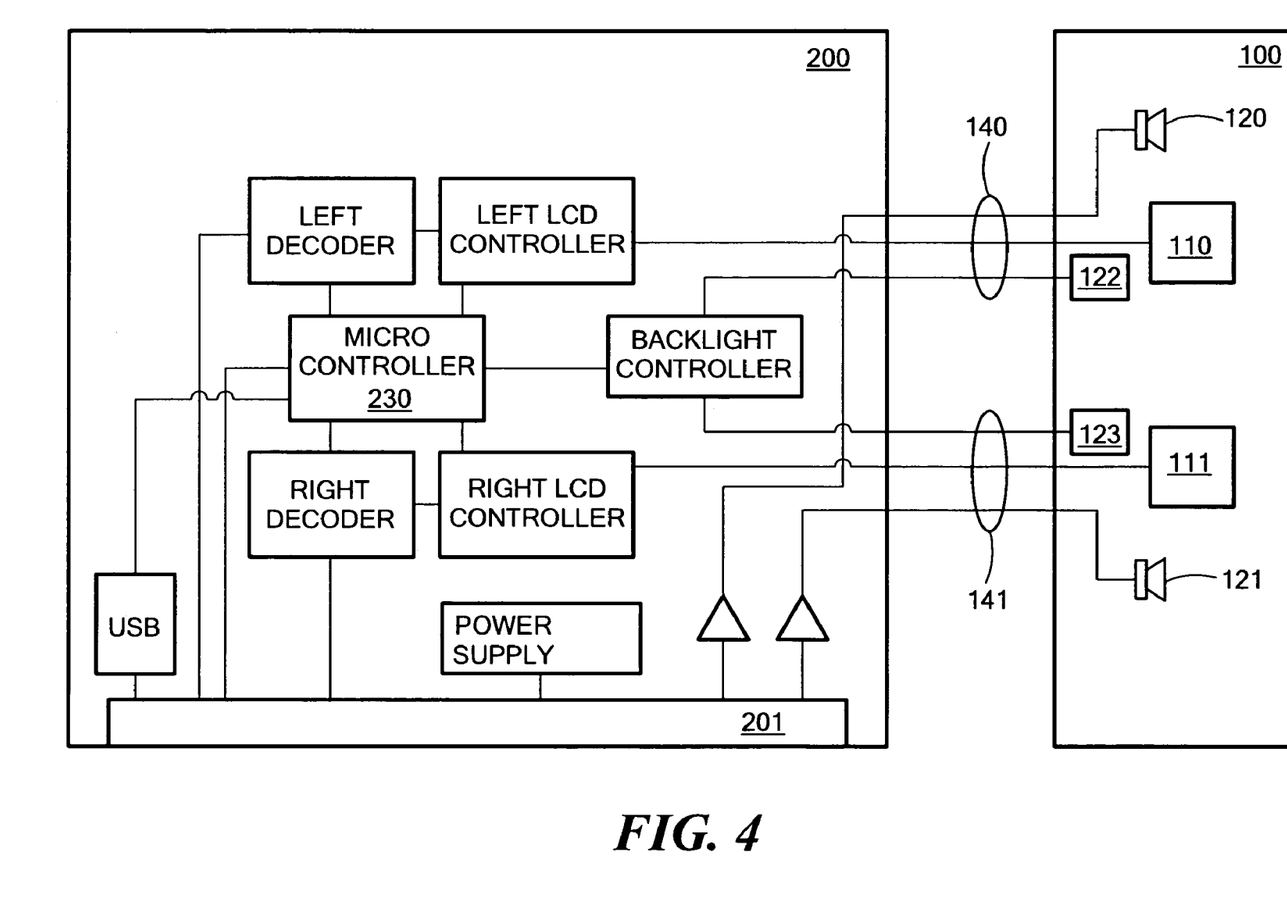
FIG. 4 is a block diagram of a further embodiment of the eyewear display interface circuitry employing a stereo video drive scheme.

FIG. 4 shows an example of an upper portion 200 which includes a stereo video drive scheme, with two-channel analog (RGB) input. The number of pins has been increased from those in Table 1 to allow stereo analog data.

Figure 5:
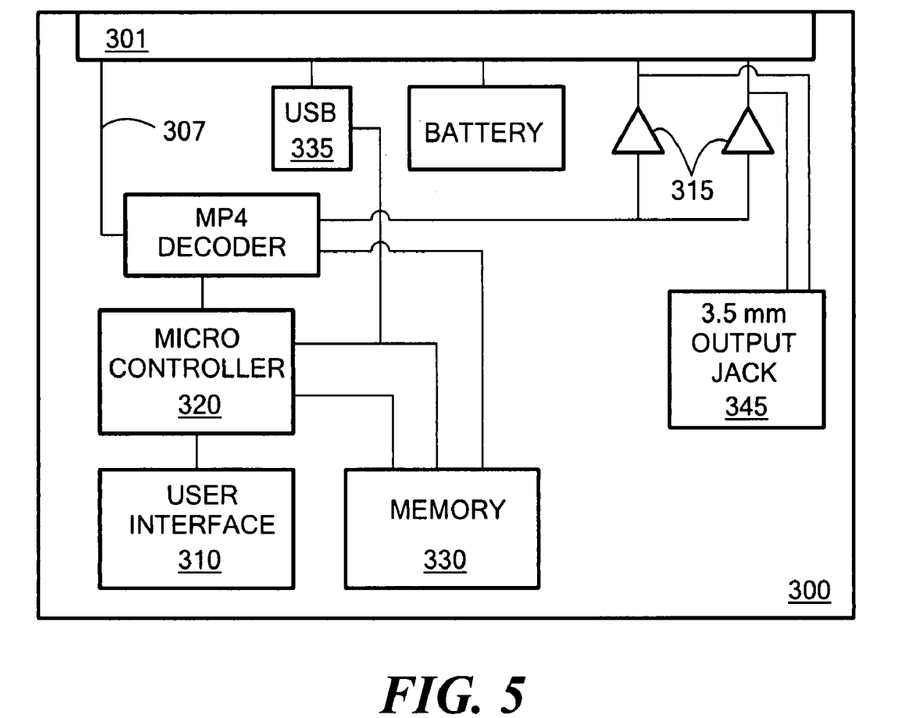
FIG. 5 is a block diagram of media device circuitry of the lower part.
Figure 6:
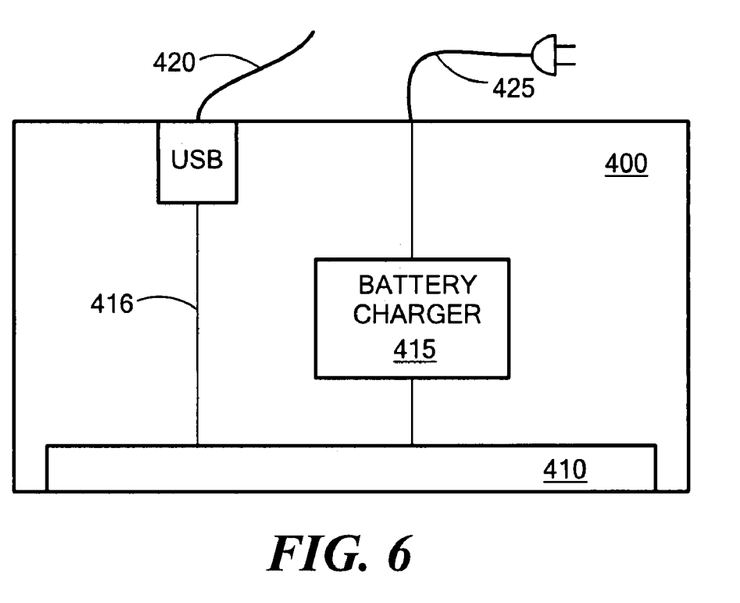
FIG. 6 is a block diagram of a charging device for connection with the lower part.

FIG. 5 shows a block diagram of a media device 300 comprising an MP4 player. In this example, MP4 compressed video data is provided to the device through a USB UART 335 and is stored in memory 330. On playback, the data is passed to an MP4 decoder which provides audio to pre-amps 315 which are connected to audio output jack 345. Uncompressed video data is provided by BT656 bus 307 to the connector 301. Audio and power are also provided to the connector 301. A micro-controller 320 governs the functions of the various circuits. A user interface 310 is provided for user controls. In order to load data into media device 300, and to charge the battery, media device 300 is connected to a charging device 400 which has a 30 pin connector 410, charging circuit 415 and USB pass-through 416, as shown in FIG. 6. The charging circuit may be connected to AC power through a line cord 425, or power may be obtained from the USB connector. The USB may be connected to a personal computer through cable 420, or to a wall plug adaptor (which provides only power to the USB cable).

Figure 7:
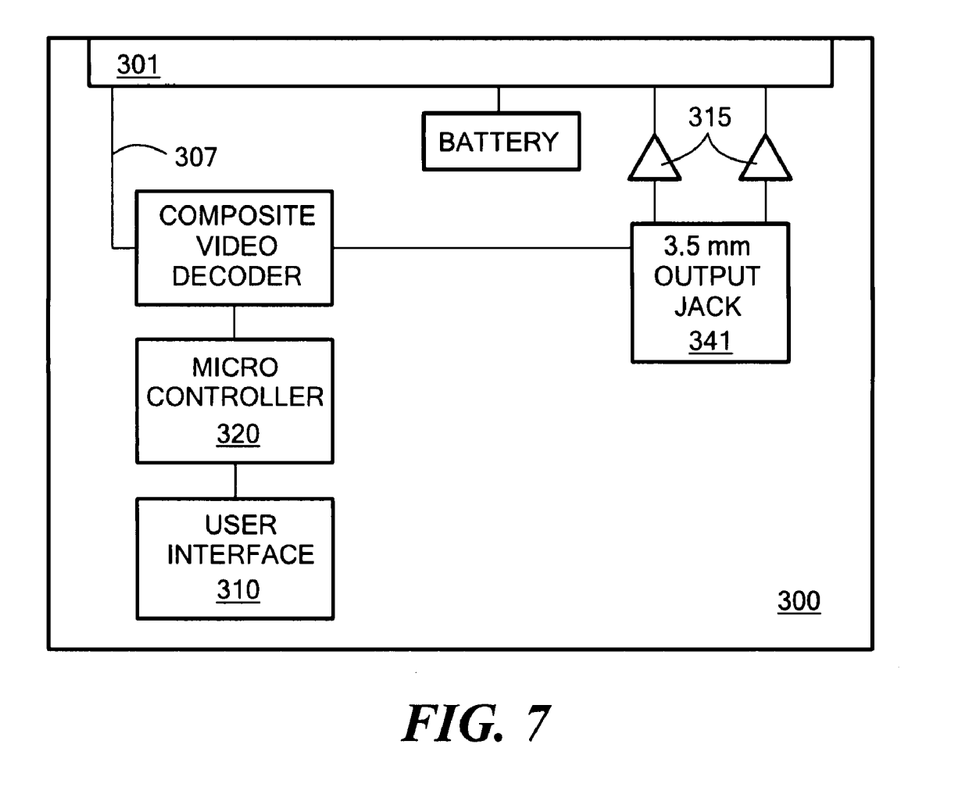
FIG. 7 is a block diagram of media device circuitry of the lower part operative as an interface to a media device.

Interfaces to media devices may be included. In previous U.S. patents, interface electronics and power may be located in a housing that is connected to the eyewear by a cable (see for example U.S Pat. No. 6,091,546). Such interfaces may be located in the lower portion 300 of the electronics. FIG. 7 shows a block diagram of an electronic circuit that permits the interface electronics to be connected by a cable to a remote media device, through an input jack 341. In this example, the input signal may be composite video plus line-level audio. The audio circuit is amplified by amplifiers 315 so that audio output is present on connector 301. The composite video is provided to a composite video decoder which provides digital video on the BT656 bus 307. The operation of the device is controlled by microcontroller 320 and user controls are provided by user interface 310, which may comprise buttons or switches on the surfaces of the lower part 300.

Figure 8:
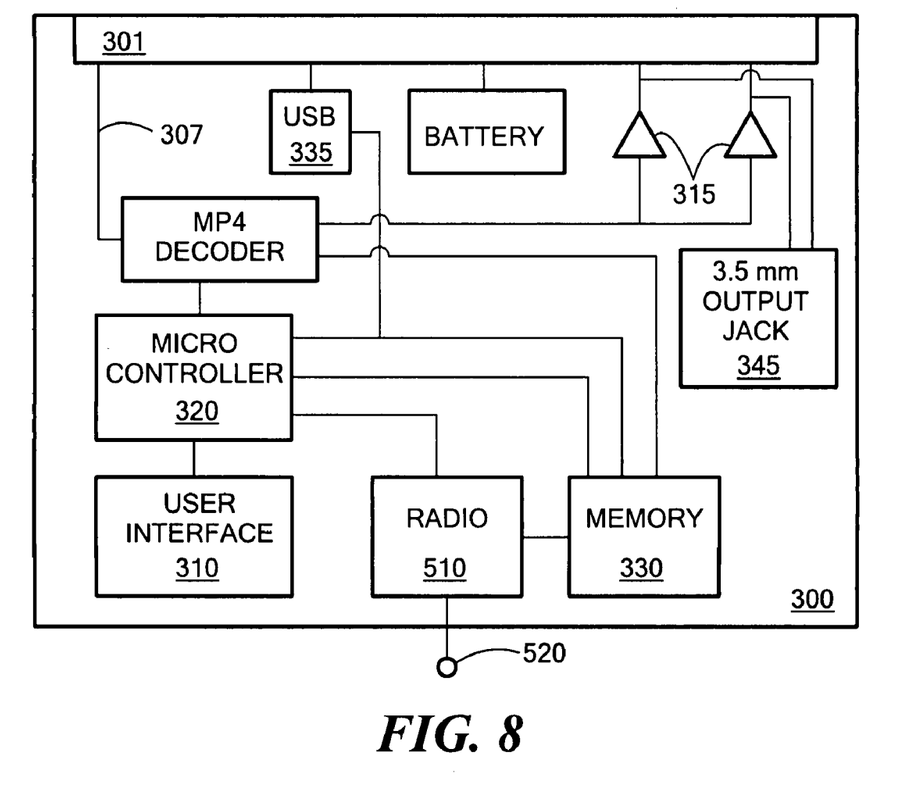
FIG. 8 is a block diagram of a wireless media device interface of the lower part.

An alternative interface to an external media device is a wireless interface, as shown in FIG. 8. In this case signals are received by radio 510 through antenna 520. These signals may be analog or digital, but preferably are digital. Radio 510 may be a bluetooth radio, or a WiFi radio, or a WiMax radio, or use some other digital standard. The radio receives audio and video data, preferably in compressed form (such as MP4), and these data are stored in memory 330. The microcontroller 320 controls and synchronizes the radio 510, memory 330, and MP4 decoder. For the case where the images are in MP4 format, the compressed images are decoded and provided to the BT656 bus 307, or to a digital bus of another type. Decoded audio is provided to the amplifiers 315.

The use of cameras and microphones have been described in U.S Pat. No. 6,091,546. The electronics may be configured to return audio and images to the media device that are captured by microphones and cameras in the eyewear.

The media device (whether remote or installed in lower part 300) may comprise an MP4 player, a cellular telephone handset, a DVD player, a portable television, a camcorder or a camera.

Figure 9:
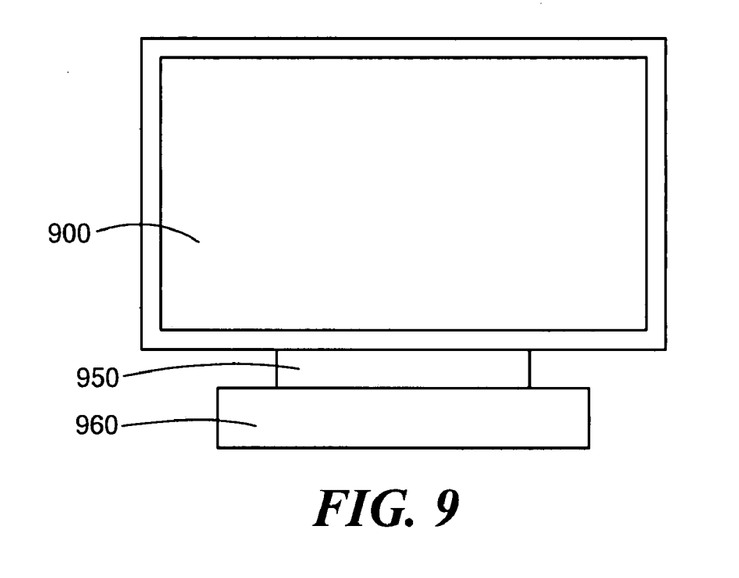
FIG. 9 is a schematic diagram illustrating an integrated display in the upper part.

Alternatives to eyewear system 100 are possible. The upper part 200 may include an integrated display 900 shown in FIG. 9 which is mechanically and electrically connected to a stand 950. Stand 950 and lower part 960 include connectors designed to provide an electrical interconnect as has been described, as well as a mechanical support. Any type of display including flat panel displays, or projection displays may be integrated in upper part 200.

The invention is not to be limited by what has been particularly shown and described, except as indicated by the appended claims.

What is claimed is:

1. An eyewear display and media device interconnection system comprising:
    an upper part comprising eyewear display interface circuitry comprising circuits for formatting audio and video data to an eyewear display;
    a lower part comprising a media device or media device interface;
    the upper part and lower part include an electrical interface connection for transmitting video and audio signals between the upper part and the lower part;
    a connecting device for connecting and disconnecting the upper part and lower part; and
    the circuitry in the upper part includes a display controller for sending drive signals to the eyewear display , and a microcontroller for transmitting input signals from the lower part via an analog-to-digital converter or a digital bus to the display controller.

2. The system of claim 1, wherein the electrical interface connection between the upper part and the lower part further transmits power between the upper part and the lower part.

3. The system of claim 1, wherein the electrical interface connection comprises one or more of an audio interface, a video interface, horizontal and vertical strobe lines, a microphone interface, an RGB interface, a digital communication channel, and a clock line.

4. The system of claim 1, wherein the interface connection transmits analog signals, digital signals, or analog and digital signals.

5. The system of claim 1, further comprising circuitry in the upper part for configuring video processing for compatibility with the media device or media device interface in the lower part.

6. The system of claim 1, wherein the circuitry in the upper part comprises a display controller for sending drive signals to the eyewear display.

7. The system of claim 1, wherein the display controller comprises a left controller and a right controller for providing stereo video signals to the eyewear display.

8. The system of claim 1, wherein the circuitry in the upper part includes an analog-to-digital converter.

9. The system of claim 1, wherein the circuitry of the upper part comprises a backlight controller for transmitting drive current to a backlight of the eyewear display.

10. The system of claim 1, wherein the circuitry of the upper part comprises audio circuitry for sending audio signals to earphones in the eyewear display.

11. The system of claim 1, wherein the upper part further supplies power to the eyewear display.

12. The system of claim 1, wherein the upper part further includes a display.

13. The system of claim 1, further comprising circuitry in the lower part for detecting a type of eyewear display and configuring video data to match the eyewear display.

14. The system of claim 1, wherein the media device in the lower part comprises an MP3 player, an MP4 player, a DVD player, a game system, a GPS system, a cellular telephone, a digital television, a camcorder, a camera, electronic book reader, a portable communication device or a portable entertainment device.

15. The system of claim 1, wherein the lower part includes a microcontroller for transmitting video data and audio signals to the upper part via the electrical interface connection.

16. The system of claim 1, wherein the lower part includes video data memory.

17. The system of claim 1, wherein the lower part includes a decoder for transmitting uncompressed video data from memory to the upper part via the electrical interface connection.

18. The system of claim 1, wherein the lower part includes audio circuitry for transmitting audio signals to the upper part.

19. The system of claim 1, wherein the lower part comprises a power source or a connection to a power source.

20. The system of claim 1, wherein the lower part includes a connection for receiving compressed video data, and a decoder for transmitting uncompressed video data via the interface connection to the upper part.

21. The system of claim 1, wherein the lower part includes a wireless interface for transmitting and receiving video, audio, and control signals.

22. The system of claim 1, further comprising user controls disposed on the lower part.

23. The system of claim 1, wherein the upper part and the lower part are mountable to an eyewear frame.

* * * * *